(12) United States Patent
Booton

(10) Patent No.: US 8,209,421 B2
(45) Date of Patent: Jun. 26, 2012

(54) COMPUTER TELEPHONY SYSTEM

(75) Inventor: Laurence J Booton, Suffolk (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 12/594,633

(22) PCT Filed: Feb. 28, 2008

(86) PCT No.: PCT/GB2008/000673
§ 371 (c)(1),
(2), (4) Date: Oct. 5, 2009

(87) PCT Pub. No.: WO2008/119926
PCT Pub. Date: Oct. 9, 2008

(65) Prior Publication Data
US 2010/0121933 A1   May 13, 2010

(30) Foreign Application Priority Data
Apr. 3, 2007  (GB) .................................. 0706494.2

(51) Int. Cl.
G06F 15/16 (2006.01)
H04Q 11/00 (2006.01)

(52) U.S. Cl. .................... 709/227; 709/201; 370/270
(58) Field of Classification Search .................... None
See application file for complete search history.

(56) References Cited

U.S. PATENT DOCUMENTS

| | | | | |
|---|---|---|---|---|
| 6,154,147 A * | 11/2000 | Gabrielle et al. | ............ | 340/7.52 |
| 7,079,481 B2 * | 7/2006 | Kramer | ......................... | 370/218 |
| 7,227,927 B1 * | 6/2007 | Benedyk et al. | ............ | 379/9.05 |
| 7,483,369 B2 * | 1/2009 | Chavez et al. | ................ | 370/219 |
| 7,526,533 B1 * | 4/2009 | Bue et al. | ....................... | 709/220 |
| 7,725,764 B2 * | 5/2010 | Morosan et al. | .................. | 714/6 |
| 7,805,517 B2 * | 9/2010 | Shim et al. | ..................... | 709/227 |
| 2003/0169866 A1 | 9/2003 | Williams et al. | | |
| 2004/0100970 A1 | 5/2004 | Gerdisch et al. | | |
| 2006/0072523 A1 | 4/2006 | Richardson et al. | | |
| 2006/0271813 A1 | 11/2006 | Horton et al. | | |

FOREIGN PATENT DOCUMENTS
WO    WO 2004/028066    4/2004

OTHER PUBLICATIONS

Johnston, A., "SIP Understanding the Session Initiation Protocol", ARTECH House, Inc., pp. 81 and 82.
Singh et al., "Failover, load sharing and server architecture in SIP technology" Computer Communications, vol. 30, No. 5, (Feb. 20, 2007), pp. 927-945.
Ohlmeier, N., "Design and Implementation of a High Availability SIP Server Architecture", Internet Citation, (Jul. 9, 2003), pp. 1-106.
Carter, R.L. et al, "Server selection using dynamic path characterization in wide-area networks", INFOCOM '97, vol. 3, (Apr. 7, 1997), pp. 1014-1021.

(Continued)

Primary Examiner — Yemane Mesfin
(74) Attorney, Agent, or Firm — Nixon & Vanderhye P.C.

(57) ABSTRACT

The system comprises a client and a set of servers for processing calls in a communications system; the servers providing call status messages to the client; in which each call status message comprises an identifier associated with the call to which the message relates. The client is arranged to handle duplicate copies of call status messages as follows. The client receives a copy of each call status message from each of the servers and identifies duplicate copies of each message received by reading the identifier in the received messages.

12 Claims, 5 Drawing Sheets

OTHER PUBLICATIONS

"Scenarios for Computer Supported Telecommunications Applications (CSTA) Phase III", ECMA TR/82, $2^{nd}$ edition, (Dec. 2000), 64 pages.

International Search Report for PCT/GB2008/000673, mailed Nov. 13, 2008.

UK Search Report for GB Application No. 0706494.2, dated Jul. 31, 2007.

"Scenarios for Computer Supported Telecommunications Applications (CSTA) Phase III", ECMA TR/82, $2^{nd}$ edition, (Jun. 2009), 64 pages.

* cited by examiner

COMPUTER TELEPHONY SYSTEM

This application is the U.S. national phase of International Application No. PCT/GB2008/000673 filed 28 Feb. 2008, which designated the U.S. and claims priority to GB Application No. 0706494.2 filed 3 Apr. 2007, the entire contents of each of which are hereby incorporated by reference.

The invention relates to a computer telephony system and, in particular, to a computer telephony system with a client served by more than one server.

To increase the resilience of communications systems and produce so-called high reliability (resilient) systems, servers are duplicated so that the failure of a server no longer results in a complete loss of service but where service can be continued using a duplicate component. The duplicated servers may comprise two or more servers operated in parallel so as to provide improved resilience.

In one example of a resilient system, the underlying operating system of two separate servers sharing a task, communicate with each other to determine which one should be the active server (i.e. executing the task) and which one should be inactive, (i.e. on standby). Applications running on the active server receive the result of this determination and, as a result, execute the task, e.g. attempting to provide a communications service. Applications running on the standby server also receive the result of this determination and, as a result, do not attempt to provide the service. Thus only one sever is running the live service at any one time. If the active server was to crash, the standby server would automatically detect this, and take over as the new active server. Hence the service can continue relatively unaffected by a single failure. One aspect of such resilient systems is the need for both servers to communicate with the client (i.e. a processing device or terminal receiving messages relating to the service on behalf of a user). Known resilient systems address this need by supporting virtual IP address working. In virtual IP address working, the active server has a particular IP address allocated to it for the purposes of communicating with the client. If the active server were to fail, the standby server, upon becoming the new active server, "takes over" that IP address. Thus the client has no knowledge of the resilient system underneath it: but automatically connects to whichever server is active using the one IP address. FIG. 1, described further, below, shows an example of virtual IP address working.

A problem with this resilient method is determining which server is truly running the best. It is true that the method may determine what hardware and OS is running the best, but another important aspect is the service running on that server. If server A and sever B are running perfectly, the resilient system has to arbitrarily decide to make one or other server (for example: server A) the active one. However, the service on server A could be running slowly and the service on server B perfectly. In this example, the resilient system is performing as it is designed to but this is resulting in a sub-standard service.

The known method is also limited in that the servers sharing the same IP address need to be located in the same network. (i.e. in the same IP address space). This limits the topology of the resilient system.

The switching between servers required in the known resilient method calls for a complex system that is vulnerable to failure. The servers must also be capable of supporting such switching.

It is these problems that the invention addresses.

The present invention provides a computer telephony system comprising a client for processing calls in a communications system; in which the system also comprises a set of servers for providing call status messages to the client; in which each call status message comprises an identifier associated with the call to which the message relates; in which the client comprises: receiving means for receiving from each of the servers a copy of a message relating to a call and identification means for identifying duplicate messages with reference to the identifier.

Preferably, the client is arranged to send a request message to the communications system via one of the servers and the client comprises means for determining the relative performance of the servers and for sending the request message to the server determined to have a higher relative performance. The relative performance of the servers may be derived from the time of receipt at the client of one or more call status messages.

According to an alternative embodiment, the client is arranged to send duplicate copies of a request message to the communications system via each of the servers. In this case, the communication system is arranged to process a copy of the request message that it receives first and to identify as a duplicate and to reject a copy of the request message that it receives subsequent to the first copy.

In various aspects of the invention, all copies of a duplicated request message may be allocated to a common IP address and each copy of a duplicated request message is allocated to a unique IP address.

The invention is applicable at more than one part of a computer telephony system and the client may interface directly with a user of the system or form part of a server for servicing a further client and more than one instance of a client may exist in a single system.

According to the invention, the identifier may comprise a call identity or a message identity.

The present invention also provides a method for processing calls in a computer telephony system comprising a communications system, connected to a client via a plurality of servers, the method including the steps of the client receiving a copy of a call status messages from each server of the plurality of servers; reading in each copy an identifier associated with the call to which the message relates; and identifying duplicate messages with reference to the identifier.

Additionally, from a further aspect, the invention also provides a computer program or suite of computer programs. Additionally, from a yet further aspect, the invention also provides a computer readable storage medium storing a computer program or at least one of suite of computer programs according to the third aspect. The computer readable storage medium may be any magnetic, optical, magneto-optical, solid-state or other storage medium capable of being read by a computer.

The invention will now be described by way of example only with reference to the drawings, in which.

As set out above, the known method involves only one of the servers being active at a time. According to this solution, the servers share a "virtual" IP address that is switched between servers if changeover is required.

Figure 1:
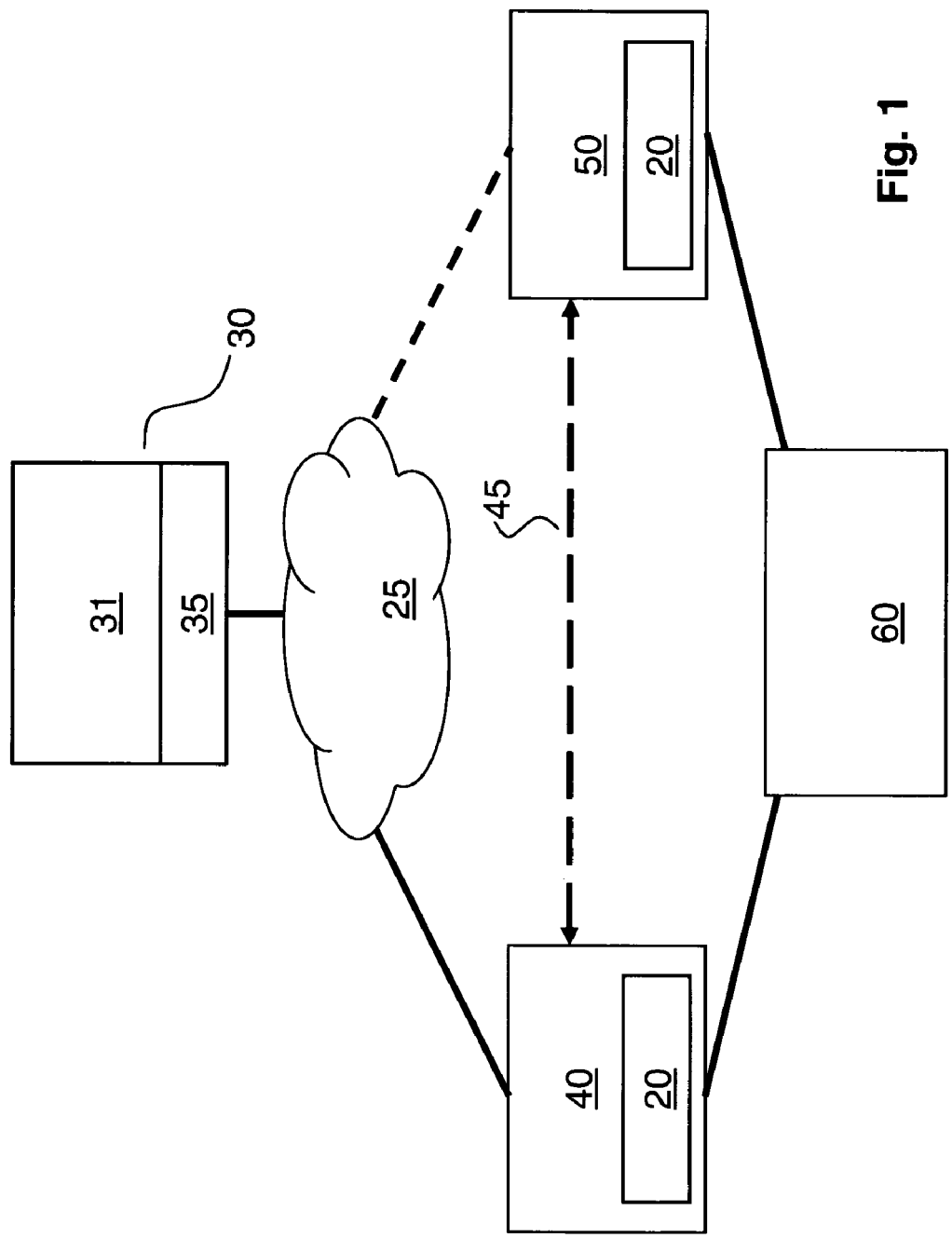
FIG. 1 shows schematically a known arrangement of a computer telephony system.

FIG. 1 shows an example of virtual IP address working. In FIG. 1, client 30 comprises client application 31 charged with interfacing with a user (not shown) and controlling communications with communications system 60 on behalf of the user. Client application 31 can make calls, answer calls and detect the status (e.g. on/off-hook) of telephones forming part of communication system 60. The connection between client 30 and communications system 60 is made via a pair of servers 40, 50 connected in parallel. The use of two servers connected in parallel increases the resilience of the system in providing for a continued communication path in the event of a single failure on severs 40, 50. Client 30 also comprises applications programming interface (API) 35 charged with handling, on behalf of client application 31, the IP communications links with servers 40, 50.

In FIG. 1, client machine 30 maintains, via API 35, TCP/IP connections to dual resilient IP servers 40 and 50, although it is only in active communication with one of them at any one time. In FIG. 1, client 30 is shown in active communication with server 40 (as denoted by the solid line) and not with server 50 which is in standby (as denoted by the broken line), although the situation can change so that server 50 becomes active and server 40 reverts to standby. IP client application 31, comprised in client 30, processes messages received from (and sends messages to) servers 40, 50. Client application 31 is programmed to handle a single instance of each call and API 35 is programmed to communicate with a single IP destination address in relation to each call handled by client application 31. Both limitations are accommodated by the assignment of a single virtual IP address to each call, as represented figuratively in FIG. 1 by virtual IP address cloud 25.

The resilient servers 40, 50 of FIG. 1 exchange "heart-beat" messages over private network 45 that is established between the two servers for this purpose. Software running in each of servers 40 and 50 to support resilient operation is able to monitor the operation of both servers 40, 50 by means of the heart-beat messages and to determine which server should be active and which should be in standby. The selection process is hidden from the client which is not aware of the fact that more than one server may be providing it with messages relating to the call. In FIG. 1, the resilient software, by exchanging "heart-beat" messages with its peer server, has determined that server 40 is active and sever 50 is in standby.

Although FIG. 1 shows one IP address shared by two severs, the idea could be applied to more than two servers operating in parallel and sharing a single IP address, e.g. to further increase resilience. The IP address is termed "virtual" to reflect the fact that it is not permanently associated with any particular server but is dynamically allocated to that one of the servers that is selected to be active at any one time.

The arrangement of FIG. 1 incurs the overhead of private network 45 to link the duplicate servers to allow negotiation as to which is to be active and is to use the virtual IP address and which is to be dormant at any one time. The duplicate servers also need to be specially configured in order to support address-sharing. This arrangement is dependent on a complex system to implement and supervise switching between servers that is vulnerable to failure.

This invention addresses the above problems by enabling the client to receive redundant messages: one from each of two or more duplicate servers. On receipt of these redundant messages; the communications process at the client can malfunction, leading to disruption of the communication and loss of service. The problem of redundant messages is overcome, according to the invention, by arranging for messages to be tagged to allow redundant messages to be identified by the client and dealt with accordingly.

According to a preferred embodiment, the messages are tagged using call identity information. This exploits situations where call identity information is included in the call progress messages (events) generated by the communication system and passed by the servers to the client. Use of call identity information in this way can improve the performance of the client by allowing it to identify and effectively deal with redundant messages.

Call identity information is not universally included in call progress messages passed to the client in computer telephony systems. According to an alternative embodiment, the messages are tagged using message identity information, for example, message count values contributed by the communications system.

According to the present invention, the client can react to the receipt of redundant messages in two ways. In a first mode of operation, the client discards messages identified as redundant and continues with processing a single message for each event, as before. In a second mode of operation, the client actively checks for redundant copies of messages in order to provide higher confidence in the accuracy of the received messages and/or as a check on the performance of the redundant servers to allow remedial action to be instigated before the situation becomes critical and affects the operation of the system. In either mode, processing of messages proceeds as before.

The first mode is inherently resilient. For each event in a call, the first message received from one or other duplicate server is accepted and processed by the client. Any duplicate messages for the same call event as part of the same call are discarded and do not affect the correct operation of the client. If all of the duplicate servers are operating correctly, then the client effectively interacts with whichever is the faster, also leading to an increase in overall processing speed. This applies even if the response speeds of the duplicate servers change in the course of a call so that some messages from each duplicate server are processed over the life of the call. If one of the duplicate servers is out of action or unreachable for any reason, then the client just interacts with the remaining server or servers.

The second mode can be arranged to share a similar level of resilience with the first mode. To achieve this, the receipt of the second copy of a duplicated message is not required for correct operation of the client but is merely monitored as an additional health check on the system. As in the first mode, for each event in a call, the first message received is accepted and processed by the client which also monitors for receipt of the second copy of each message and raises an alarm if the expected copy is not received within a time limit. The time limit may be calculated either from the issue by the client of the original message to the servers provoking the received message or from the receipt of the first copy of the message at the client.

In an alternative version of the second mode, it may be desirable to ensure that both copies of a duplicated message are received by the client before the message is processed. This is achieved, in a variant of the second mode, by API layer 36 waiting for both copies of a message to be received before passing the message to client application 31. Again, an alarm is raised if no copies of messages are received or only one copy is received within an appropriate time limit.

In either mode of operation, the client can send its messages via one or more of the servers. Hence, the client could be arranged to send each request via any one of the servers or to the server with the best performance (which may be judged from the speed of return of the response messages)

Alternatively, the client could be arranged to send each request via each of the servers. This operation would only be chosen if the communication system is able to accept the duplicate requests that the client sends according to this variant. The request that arrives at the communication system first, will be the one that is processed and will generate a response returned to the client. The second request is identified as a duplicate and is rejected by the communication system and a "reject" message sent to the client. The client is able to recognise the reject message as pertaining to a duplicate request, and therefore proceeds to process the other, successful response.

According to a preferred embodiment, client application 31 issues each message via API layer 36 to only one of servers 40, 50. Normally, a message will be issued to the server that has responded correctly to a previous message in advance of the other server. This will result in a reduction in processing load for the slower server and introduces a form of local load-balancing. According to each of the above embodiments, communications system 60 continues to send a copy of each message to each of servers 40, 50: thereby retaining resilience.

Figure 2:
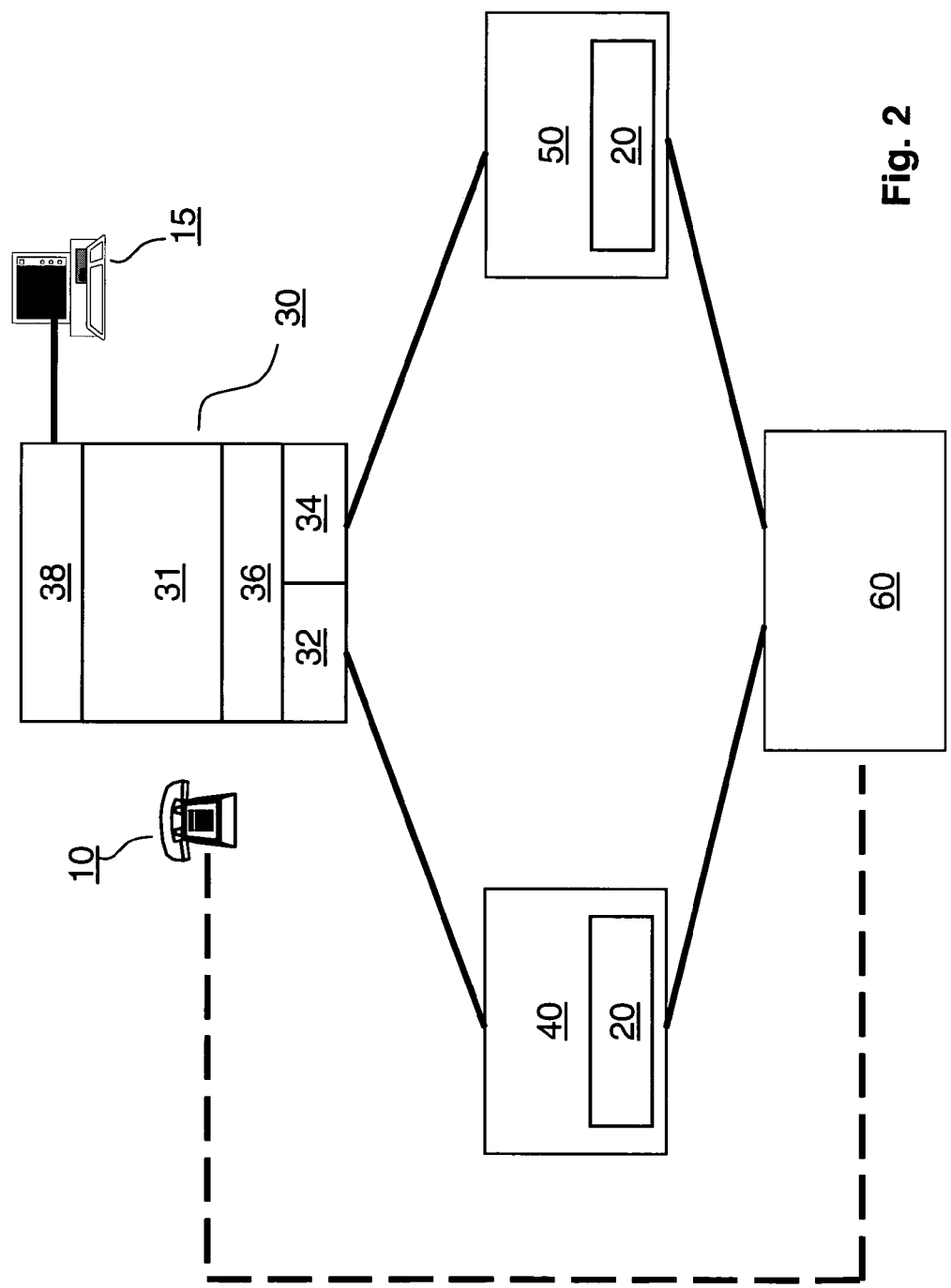
FIGS. 2 to 5 show schematically arrangements of a computer telephony system according to embodiments of the invention.

As shown in FIG. 2, client 30 includes single client application 31 connected to both resilient Servers 40, 50. Servers 40, 50 are allocated different IP addresses and may be located in different networks within different IP address spaces. To handle communications using the two IP addresses, client 30 includes dual APIs 32, 34: one for each resilient server-allocated IP address. As before, client application 31 is a communications application that can make calls, answer calls and detect the status (e.g. on/off-hook) of telephones forming part of communication system 60. Typically, client 30 will run on a workstation assigned to a user and provided with a user terminal (screen, keyboard) 15. Client application 31 supports a graphical user interface (GUI) 38 to control the display on user terminal 15. Typically, client 30 will also be collocated with a telephone terminal 10 connecting into communications network 60. Accordingly, the service 20 running on resilient servers 40, 50 is a telephony state server and protocol converter, i.e. it might convert between the protocols used in the communication system and a protocol more suited to the server or the client and build up a state model of the calls on the communication system. It would then pass messages to the client application at the appropriate points in the call.

Included in some telephony event messages is something termed a "call identity" or "Call ID". This is a unique number or identifier that links all the events belonging to a single call. Typically, the Call ID is generated by the communication system 60. The duplicate server arrangement of FIG. 2 can result in the client 30 receiving two messages relating to the same event: one from each of resilient servers 40, 50 and both bearing the same Call ID. A commonly used format for the call identity information is prescribed by Ecma International as a Computer-Supported Telecommunications Application (CSTA) standard and also in Session Initiation Protocol (SIP).

Advantageously, the invention removes the need for arranging for one server to be active, one to be in standby and for managing handover between servers. As servers 40, 50 are working independently, there is no need for a private network to resolve priority between the servers.

As previously indicated: to handle the duplicated messages received at the client, two APIs (32, 34) are provided on client 30: one arranged in communication with each of duplicate servers 40, 50. Each API 32, 34 is allocated a different IP address so that communication between client 30 and server 40 is independent of communication between client 30 and server 50.

The client 30 may not be designed to deal with the duplicate streams of messages that are inherent in the arrangement of FIG. 2 and so, a further "API layer" 36 can be added to isolate the client application 31 from twin APIs 32, 34. It is the job of additional API layer 36 to filter the received messages by discarding duplicates and to forward only a single stream of messages to the client application 31.

Additional API layer 36 performs a corresponding role for messages travelling in the opposite direction, i.e. from client application 31 to servers 40, 50 by duplicating each sent message so as to provide one "copy" of each message to each of APIs 32, 34 and, hence to each of servers 40, 50. The duplicated messages could be allocated to a common IP address or two dedicated IP addresses could be used: one for each copy of the outgoing message to communications system 60.

Figure 3:
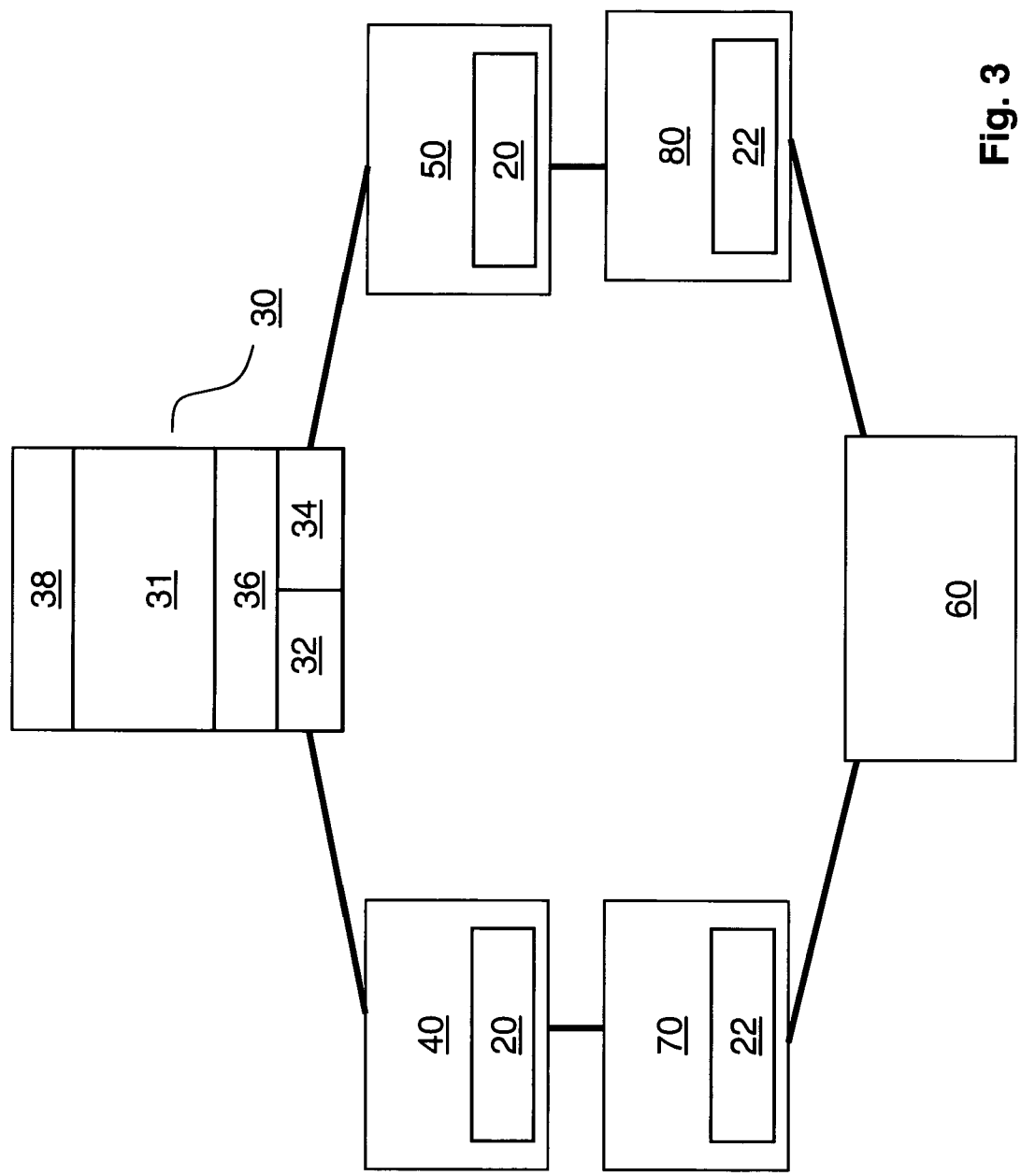

The processing performance of the servers may be enhanced by increasing their number. FIG. 3 shows a second embodiment, according to which it has been necessary, in order to meet capacity requirements, to split the functions of telephony state service 20 across multiple servers. According to FIG. 3 we now have two levels of server: first-level servers 40, 50 and second-level servers 70, 80. In FIG. 3, the processor-intensive protocol conversion element 22 of the telephony state service 20 has been split out into the two additional servers (second-level servers 70, 80). For example, first level servers 40, 50 perform the state server function. First-level server 40 is connected to second-level server 70 with which it shares a first instance of telephony state service processing. Similarly, first-level server 50 is connected to second-level server 80 with which it shares a second instance of telephony state service processing. Sharing the telephony state service processing in this way eases processor loading whilst maintaining the benefits from increased reliability demonstrated by the arrangement of FIG. 2.

Figure 4:
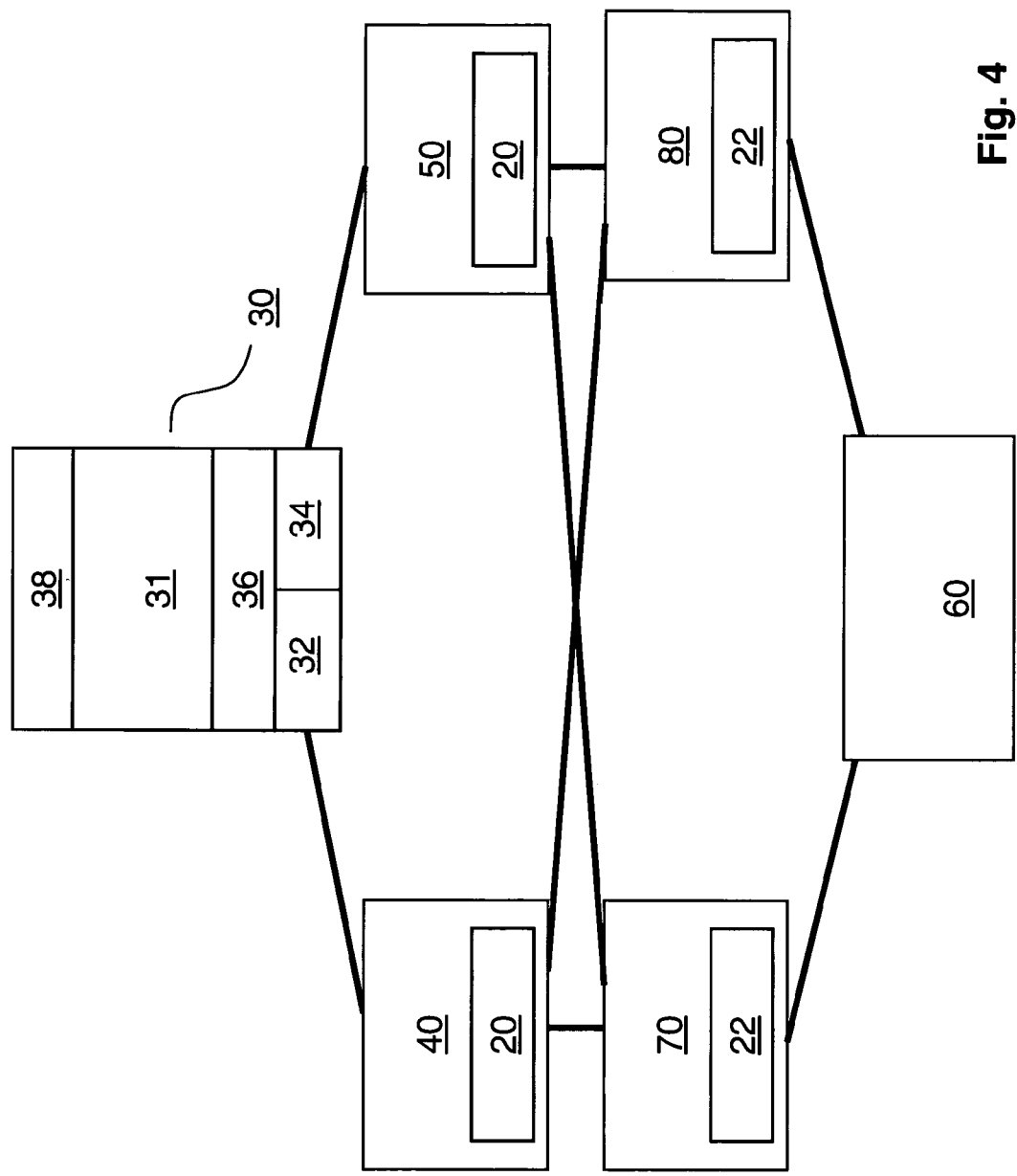

According to a third embodiment, the reliability in the arrangement of FIG. 3 is further enhanced in the arrangement of FIG. 4. FIG. 4 shows the same functional blocks as FIG. 3 but with additional interconnections.

As shown in FIG. 4, first-level servers 40, 50 are now each directly connected to both of second-level servers 70, 80. Each of first-level servers 40, 50 are now clients of the protocol conversion element 22 on each of second-level servers 70, 80. In the arrangement of FIG. 4, messages are tagged, as described earlier in the description. This tagging now allows redundant messages to be identified by the clients on first-level servers 40, 50 and to be dealt with according to one of the schemes for handling duplicate messages described above in relation to FIG. 2. This arrangement can be employed to offer higher availability at the server level, when compared with the arrangement of FIG. 3. Servers 40, 50 continue to provide duplicate messages to client 30, as before.

The present invention is not limited to one level of server, as shown in FIG. 2, or two levels, as shown in FIGS. 3 and 4 but can be employed on as many levels as required.

It may not be practical or desirable to adapt client application 31 to process duplicate messages on a call, as described above in relation to FIG. 2. According to a fourth embodiment, virtual IP address working is maintained at client application 31 for connection to first-level servers 40, 50 but handling of duplicate messages according to the invention is applied to the connection between second-level servers 70, 80 and first-level servers 40, 50. Handling of duplicate messages according to the invention may also be applied to connections between any subsequent levels of server (not shown), as appropriate.

Figure 5:
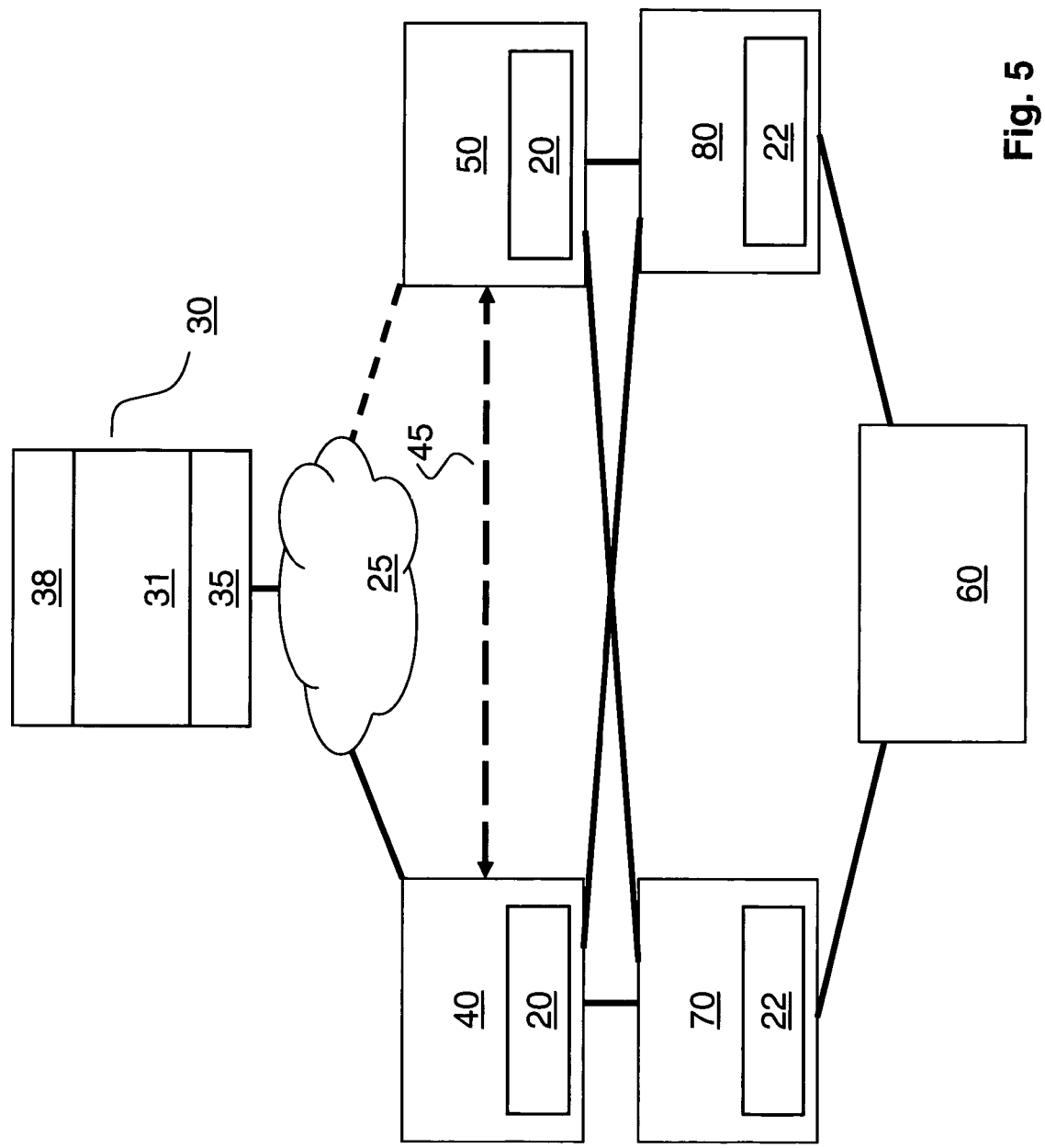

IP client 30 has TCP/IP connections to both of first-level servers 40, 50: only one of which is active at any one time. In FIG. 5, server 40 is active and sever 50 is in standby (as shown by the broken line connection to server 50). The connections to both of first-level servers 40, 50 share a common IP address, as represented by virtual IP address cloud 35.

Although client application 31 is shown in FIG. 5 as only in active communication with server 40 (as denoted by the solid line) and not with server 50, the situation can change so that server 50 becomes active and server 40 reverts to standby.

As with the arrangement of FIG. 4, in FIG. 5, first-level servers 40, 50 are each directly connected to both of second-level servers 70, 80. Each of first-level servers 40, 50 act as clients of protocol conversion element 22 on each of second-level servers 70, 80. As with the arrangement of FIG. 4, in the arrangement of FIG. 5, messages are tagged, to allow duplicate messages to be identified by the clients on first-level servers 40, 50 and to be dealt with accordingly.

Client application 31 supports a different state machine for the processing of each call that is active at any one time.

The invention provides handling of duplication at the message level by exploiting a message identifier. This is advantageously independent of IP addresses or packet identifiers which do not allow as much flexibility in the implementation of a resilient computer telephony system.

The invention provides faster operation without the need to first wait to decide if a sever is working or not and, once a decision that a server is at fault is arrived at (or if no response is received), to switch servers. The invention can advantageously provide a form of local load-balancing.

According to the invention, each of two or more redundant servers is allocated a different IP addresses so they can be allocated, if required, to different networks. The system is much simpler when compared with former arrangements in that each redundant server can operate as if in isolation and is free to forward all messages relating to the call to the client. This dispenses with the need for arbitration between servers and for the private arbitration network.

Those skilled in the art will appreciate that the above embodiments of the invention are simplified. Those skilled in the art will moreover recognise that several equivalents to the features described in each embodiment exist, and that it is possible to incorporate features of one embodiment into other embodiments. Where known equivalents exist to the functional elements of the embodiments, these are considered to be implicitly disclosed herein, unless specifically disclaimed. Accordingly, the spirit and scope of the invention is not to be confined to the specific elements recited in the description but instead is to be determined by the scope of the claims, when construed in the context of the description, bearing in mind the common general knowledge of those skilled in the art.

The content of the attached abstract is incorporated herein, as follows. The system comprises a client and a set of servers for processing calls in a communications system; the servers providing call status messages to the client; in which each call status message comprises an identifier associated with the call to which the message relates. The client is arranged to handle duplicate copies of call status messages as follows. The client receives a copy of each call status message from each of the servers and identifies duplicate copies of each message received by reading the identifier in the received messages.

The invention claimed is:

1. A computer telephony system comprising a client for processing calls in a communications system; wherein
   the system comprises a set of servers, each server comprising a computer processor, for providing call status messages to the client;
   each call status message comprising an identifier associated with the call to which the message relates; and
   the client comprising a receiver for receiving from each of the servers a copy of a call status message relating to a call and an identifier unit for identifying duplicate call status messages with reference to the identifier, wherein
   the client is arranged to send a request message to the plurality of servers of the communications system, and wherein
   the client comprises a unit for determining the server with the highest performance and for sending the request message to the server with the highest performance based on the identity of the server that sends the first call status message.

2. The computer telephony system, as claimed in claim 1, wherein
   the relative performance of the servers is indicated by the time of receipt at the client of one or more call status messages.

3. The computer telephony system, as claimed in claim 1, wherein the client is arranged to send duplicate copies of a request message to the communications system via each of the servers.

4. The computer telephony system, as claimed in claim 3, wherein all copies of a duplicated request message are allocated to a common IP address.

5. The computer telephony system, as claimed in claim 3, wherein each copy of a duplicated request message is allocated to a unique IP address.

6. The computer telephony system, as claimed in claim 1, wherein
   the client is configured to interface directly with a user of the system.

7. The computer telephony system, as claimed in claim 1, wherein
   the client is configured to form part of a server for servicing a further client.

8. The computer telephony system, as claimed in claim 1, wherein
   each call is allocated a call identity and wherein
   the identifier comprises the call identity.

9. The computer telephony system, as claimed in claim 1, wherein
   each message is allocated a message identity and wherein
   the identifier comprises the message identity.

10. A method for processing calls in a computer telephony system comprising a communications system, connected to a client via a plurality of servers, the method including
    the client receiving a copy of a call status message from each server of the plurality of servers;
    reading in each copy an identifier associated with the call to which the message relates; and
    identifying duplicate messages with reference to the identifier,
    determining the server with the highest performance; and
    sending a request message from the client to the server with the highest performance based on the identity of the server that sends the first call status message.

11. The method, as claimed in claim 10, including
    determining the relative performance of the servers by the time of receipt at the client of one or more call status messages.

12. A non-transitory computer-readable storage medium having tangibly recorded thereon a program for causing a computer system including one or more computers to perform the method steps as set out in claim 10.

* * * * *